Patented Apr. 24, 1923.

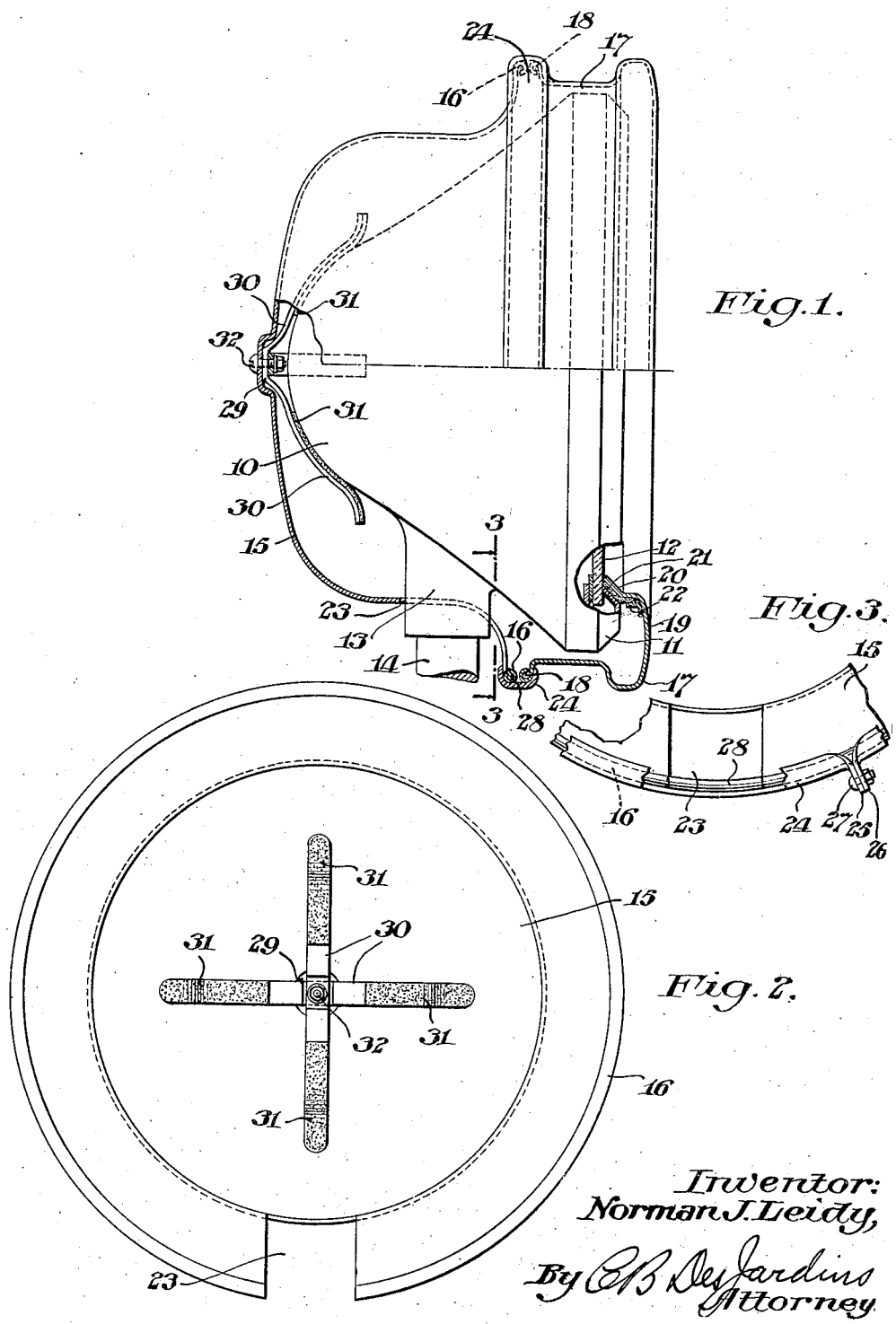

1,453,075

UNITED STATES PATENT OFFICE.

NORMAN J. LEIDY, OF PHILADELPHIA, PENNSYLVANIA.

ORNAMENTAL CASING FOR AUTOMOBILE HEADLIGHTS.

Application filed October 7, 1921. Serial No. 506,122.

*To all whom it may concern:*

Be it known that I, NORMAN J. LEIDY, a citizen of the United States, residing at Philadelphia, Pennsylvania, have invented certain new and useful Improvements in Ornamental Casings for Automobile Headlights, of which I declare the following to be a full, clear, and exact description.

My invention relates to improvements in ornamental casings for automobile headlights.

It has become a common practice for owners of moderate-priced automobiles to dress up their cars by removing the headlights, with which the automobile is equipped, and replacing these headlights by a new set, more artistic and sightly in appearance and resembling the headlights used on more expensive cars. This, however, is a rather expensive proposition as a set of these high-grade headlights, when sold at retail, brings a high price.

The object of my invention is to provide a cheap ornamental casing which may be mounted on an automobile headlight, so as to give the appearance and effect of a headlight such as is used on expensive cars.

A further object of my invention is to provide an ornamental casing and means for detachably mounting it around an automobile headlight, without disturbing or altering the headlight in any way.

A further object of my invention is to provide an ornamental casing engaging and surrounding the rear portion of an automobile headlight, an ornamental ring surrounding the front part of the headlight and means for detachably clamping said parts together on the headlight.

Further objects, and objects relating to details and economies of construction, will definitely appear from the detailed description to follow. My invention is clearly defined and pointed out in the appended claims. A structure forming a preferred embodiment of my invention is illustrated in the accompanying drawing, forming a part of this specification, in which:—

Fig. 1 is a view, partly in section and partly in elevation, of one embodiment of my invention.

Fig. 2 is a plan view of the ornamental casing, and

Fig. 3 is a fragmentary, sectional view, taken on the line 3—3 of Fig. 1.

In the drawing, the same reference numerals refer to the same parts throughout the several views, and the sectional view is taken looking in the direction of the arrows at the ends of the section line.

My invention consists in providing a casing adapted to surround the usual automobile headlight, and means for mounting the casing on the headlight. The casing will be of such a form as to resemble the casings of the more expensive headlights used on high-priced cars. The means for mounting the casing are of such a character that the casing may be mounted in place quickly and easily without disturbing the headlight or its adjustment. The casing may be mounted in place by means of a ring surrounding and engaging the front portion of the headlight and detachably clamped to the casing, which surrounds and bears against the body of the headlight. I have found it desirable to provide spring fingers carried by the casing and engaging the headlight, in order to tension the casing when clamped in place and prevent rattling.

In the drawing, I have shown an embodiment of my invention adapted for mounting on the headlight used on the Dodge automobile. Various details of the construction will differ in providing embodiments of my invention to fit on headlights of different construction, and the embodiment shown here is merely illustrative. This headlight includes a casing, 10, provided with a ring, 11, at its front end, to hold the lens, 12, in place. The casing, 10, has the downwardly-extending support, 13, through which the conduit, 14, for the electrical connections, extends.

In accordance with my invention, I provide a bowl-shaped, ornamental casing, 15, which may be spun from sheet brass, and which surrounds the greater part of the headlight casing. The forward part of the casing, 15, may be flared outwardly, slightly, and provided with a bead, 16, at its edge. I also provide a ring, 17, which surrounds the forward edge of the headlight and has a bead, 18, at its rear edge. The ring, 18, is provided with an inwardly-extending flange, 19, at its forward edge, which terminates in the inclined flange, 20, which, when the ornamental casing is mounted, engages the ring, 11, at the front of the headlight. In order to prevent rattling or squeaking, I have provided a felt strip, 21, interposed between flange, 20, and the ring, 11, and held in place by the clips, 22, fastened to the flange, 19, of ring, 17. In order to permit the headlight support, 13, to pass through the ornamental casing, I have provided a notch, 23, in the forward edge portion of casing, 15.

The casing, 15, and ring, 17, are clamped together and the casing rigidly mounted on the headlight by means of a split ring, 24, which is channel-shaped in cross-section. The beads, 16 and 18, lie in the channel of this ring, as shown in Fig. 1. The ends of the split ring have the projecting flanges, 25 and 26, which abut each other and are held together by the bolt, 27. Of course, there is no bead, 16, at the notch, 23, and I fasten a piece of wire or rod, 28, in the channel of the split ring, 24, of such a length as to fit between the ends of bead, 16, in notch, 23. This serves to position the split ring and prevent any distortion of the front edge of casing, 15, sufficient to permit the bead, 16, to escape from the channel, 24, when the ends of the split ring are clamped together.

In the rear, central portion of casing, 15, I have formed a depression, 29, in which the spring fingers, 30, are secured by bolt, 32. These fingers, 30, may carry a strip of felt, 31, and they diverge from each other and extend forwardly and yieldingly engage the rear of the headlight casing, 10. When the casing is clamped in position, these fingers are under tension and prevent any rattling and they also center the casing, 15, relative to the headlight.

It will be observed that it is a very simple matter to mount this ornamental casing on the headlight. The casing, 15, is slipped over the rear of the headlight until the spring fingers, 30, yieldingly engage. The headlight support, 13, is positioned in notch, 23. The ring, 17, is slipped over the front of the headlight until the flange, 20, engages the inner, beveled edge of ring, 11. The beads, 16 and 18, now lie alongside each other and ring 17, and casing, 15, are fastened together by engaging the split, channel-shaped ring, 24, over these beads and connecting the flanged ends of the split ring by bolt, 27. The spring fingers, 30, yieldingly center the casing, 15, relative to the headlight. It is apparent that I have provided a very simple and cheap means for mounting an ornamental casing on a headlight. The ring, 17, and casing, 15, may be nickel plated, or finished in any other desirable manner, and, when these two parts are assembled, they simulate very closely the style of headlight casing used on the better class of cars. Of course, the shape of the casing and the ring will vary to conform to the shape of the headlight which it is desired to copy. The means for mounting the casing, shown in this application, are simple and effective but other means may be used without departing from the spirit of my invention.

Having thus described my invention, what I claim as new and desire to secure by Letters Patent is:

1. The combination with an automobile headlight including a casing, of an auxiliary casing surrounding and supported by the rear portion of said headlight casing, a ring surrounding and bearing against the front portion of said headlight casing, and means for connecting said ring and auxiliary casing.

2. An auxiliary casing adapted to surround the rear portion of an automobile headlight casing, a ring adapted to surround the front portion of said headlight casing and having an inturned flange adapted to engage the front of said headlight casing, and means for connecting said ring and auxiliary casing.

3. An auxiliary casing adapted to surround the rear portion of an automobile headlight casing and provided with a bead at its forward edge, a ring adapted to surround the forward portion of said headlight casing and having an inturned flange adapted to engage the front thereof, the rear edge of said ring having a bead, a split, channel-shaped ring engaging over said beads, and means for detachably connecting the ends of said split ring.

4. An auxiliary casing adapted to surround the rear portion of an automobile headlight casing, spring means carried by said auxiliary casing and adapted to engage the rear of said headlight casing, a ring adapted to surround the forward portion of said headlight casing and having a portion adapted to engage the front thereof, and means for detachably connecting said ring and auxiliary casing to clamp the headlight casing between them.

5. An auxiliary casing adapted to surround the rear portion of an automobile headlight casing, a plurality of spring fingers carried by said auxiliary casing and adapted to engage yieldingly the rear of said headlight casing to center the auxiliary casing relative thereto, a ring adapted to surround the forward portion of said headlight casing and having a portion adapted to engage the front thereof, and means for detachably connecting said ring and auxiliary casing to clamp the headlight between them.

6. An auxiliary casing adapted to surround the rear portion of an automobile headlight casing, a plurality of spring fingers carried by said auxiliary casing and adapted to engage yieldingly the rear of said headlight casing to center the auxiliary casing relative thereto, a ring adapted to surround the forward portion of said headlight casing and having an inturned flange adapted to engage the front thereof, and a split ring detachably connecting the forward edge of the auxiliary casing and the rear edge of said ring to clamp the headlight casing between them.

7. An auxiliary casing adapted to surround the rear portion of an automobile headlight casing and having a bead at its forward edge, a plurality of spring fingers carried by said auxiliary casing and adapted to engage yieldingly the rear of said headlight casing to center the auxiliary casing relative thereto, a ring adapted to surround the forward portion of said headlight casing and having an inturned flange adapted to engage the front thereof, the rear edge of said ring having a bead, a split, channel-shaped ring engaging over said beads, and means to detachably connect the ends of said split ring.

In testimony whereof, I affix my signature.

NORMAN J. LEIDY.